(12) United States Patent
Fisher et al.

(10) Patent No.: US 10,739,793 B2
(45) Date of Patent: Aug. 11, 2020

(54) UAV WITH SELECTIVE OPERATIONAL CONTROL DURING HOLDING

(71) Applicant: Vantage Robotics, LLC, San Francisco, CA (US)

(72) Inventors: Tobin Fisher, San Francisco, CA (US); Johannes Becker Van Niekerk, Livermore, CA (US); Pavlo Manovi, San Rafael, CA (US)

(*) Notice: Subject to any disclaimer, the term of this patent is extended or adjusted under 35 U.S.C. 154(b) by 187 days.

(21) Appl. No.: 15/829,690

(22) Filed: Dec. 1, 2017

(65) Prior Publication Data

US 2018/0157276 A1 Jun. 7, 2018

Related U.S. Application Data

(60) Provisional application No. 62/428,987, filed on Dec. 1, 2016.

(51) Int. Cl.
| | |
|---|---|
| G05G 1/10 | (2006.01) |
| B64C 39/02 | (2006.01) |
| G01C 21/18 | (2006.01) |
| B64D 47/02 | (2006.01) |
| G01C 21/16 | (2006.01) |
| G05D 1/10 | (2006.01) |

(52) U.S. Cl.
CPC ........... *G05D 1/102* (2013.01); *B64C 39/024* (2013.01); *B64D 47/02* (2013.01); *G01C 21/16* (2013.01); *G01C 21/18* (2013.01); *B64C 2201/042* (2013.01); *B64C 2201/08* (2013.01); *B64C 2201/14* (2013.01); *B64C 2201/141* (2013.01)

(58) Field of Classification Search
CPC ................. G05D 1/102; B64C 39/024; B64C 2201/042; B64C 2201/08; B64C 2201/141; B64C 2201/14; B64D 47/02; G01C 21/18; G01C 21/16
USPC .......................................................... 701/3
See application file for complete search history.

(56) References Cited

U.S. PATENT DOCUMENTS

| | | | |
|---|---|---|---|
| 2015/0266575 A1* | 9/2015 | Borko | B64C 39/024 701/3 |
| 2016/0313742 A1* | 10/2016 | Wang | G05D 1/0669 |
| 2016/0349835 A1* | 12/2016 | Shapira | G06F 3/011 |

* cited by examiner

*Primary Examiner* — Paula L Schneider
(74) *Attorney, Agent, or Firm* — Knobbe, Martens, Olson & Bear, LLP

(57) ABSTRACT

A unmanned aerial vehicle (UAV) includes a body with plurality of motors, a motor controlling circuit, a microprocessor for controlling the flight state of the UAV, a plurality of motion sensors, and a capacitive touch sensor incorporated into a battery. When the user grasps the UAV by the battery, the touch sensor is activated and the microprocessor alters the flight state of the UAV.

15 Claims, 4 Drawing Sheets

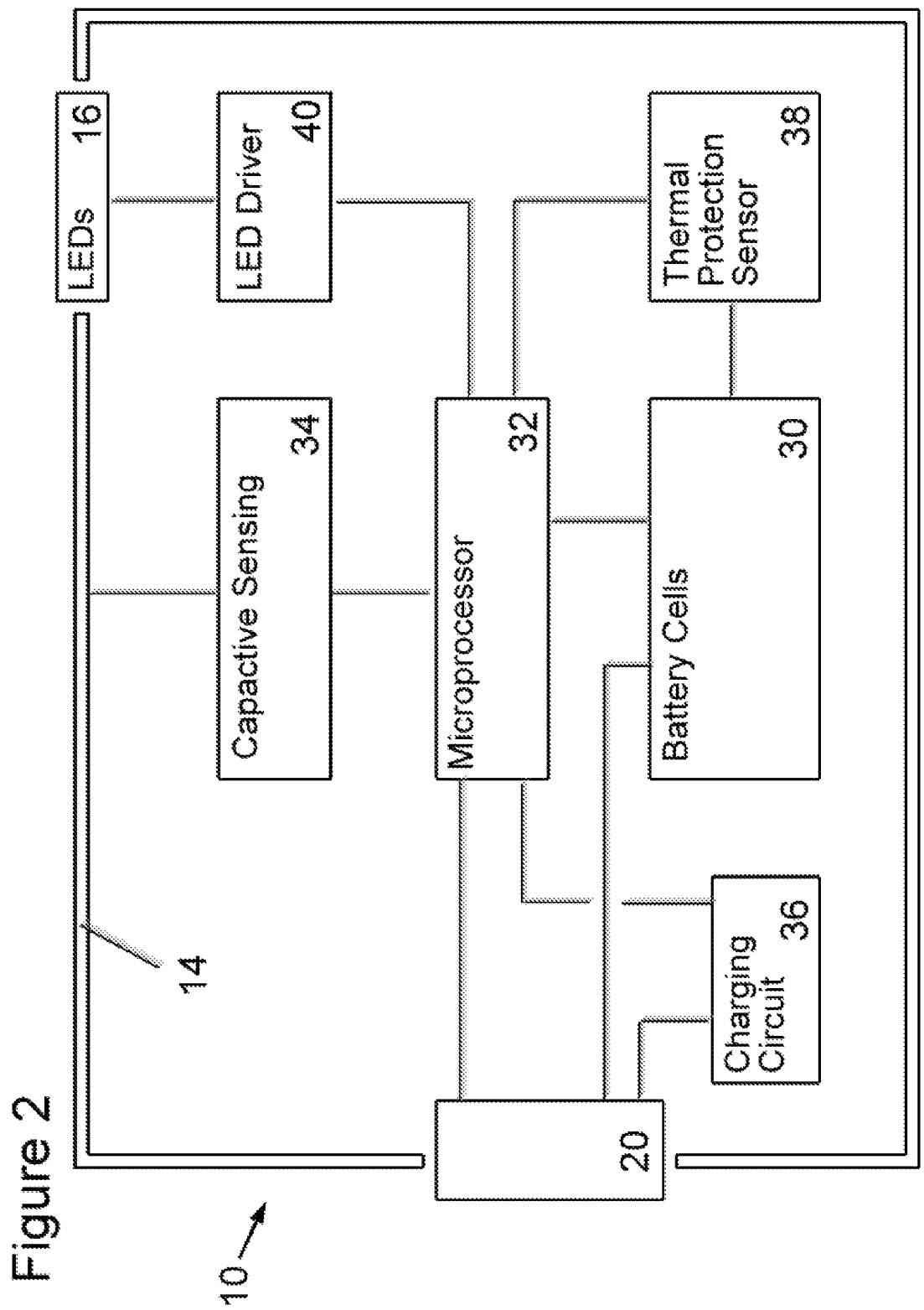

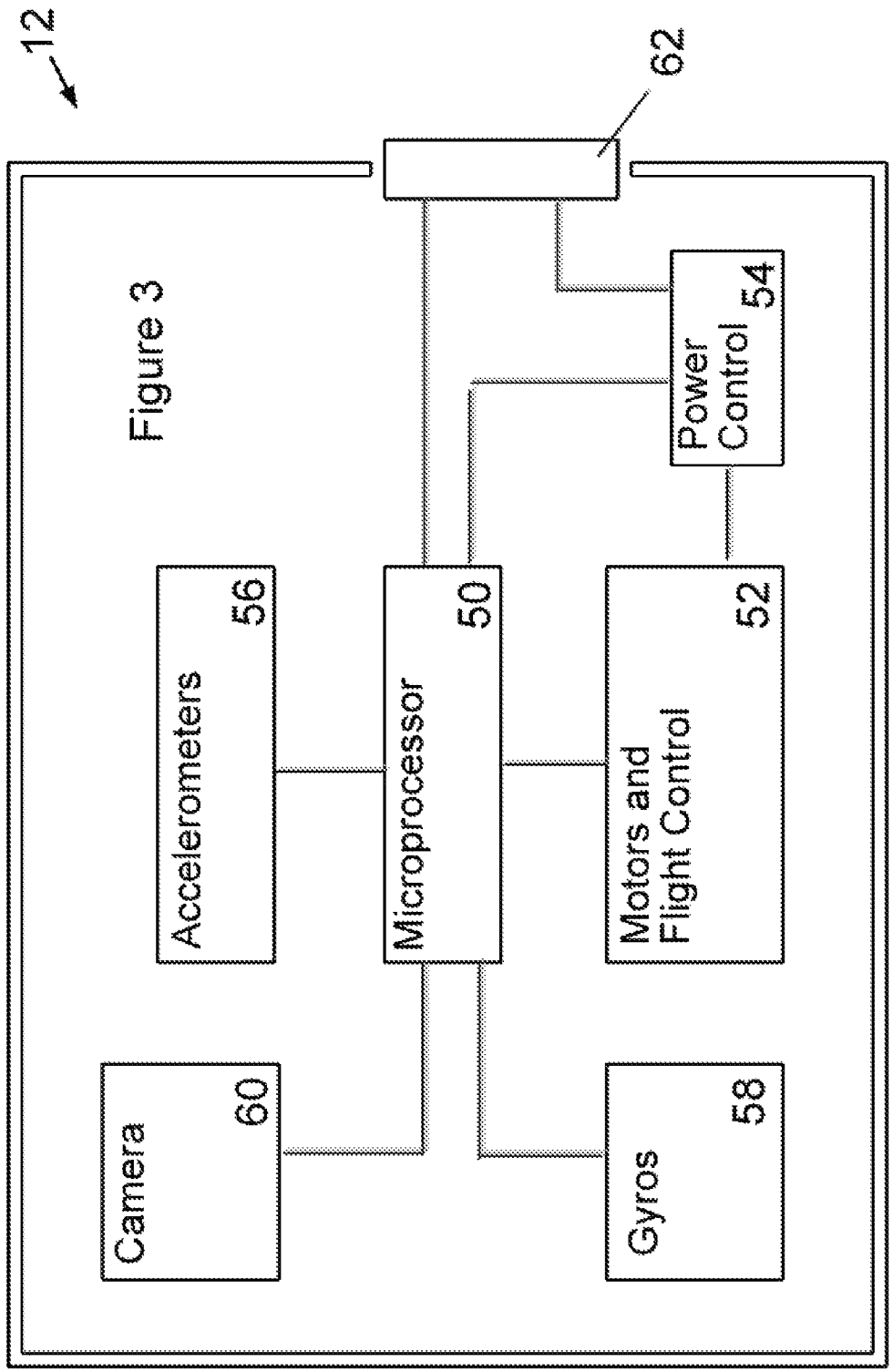

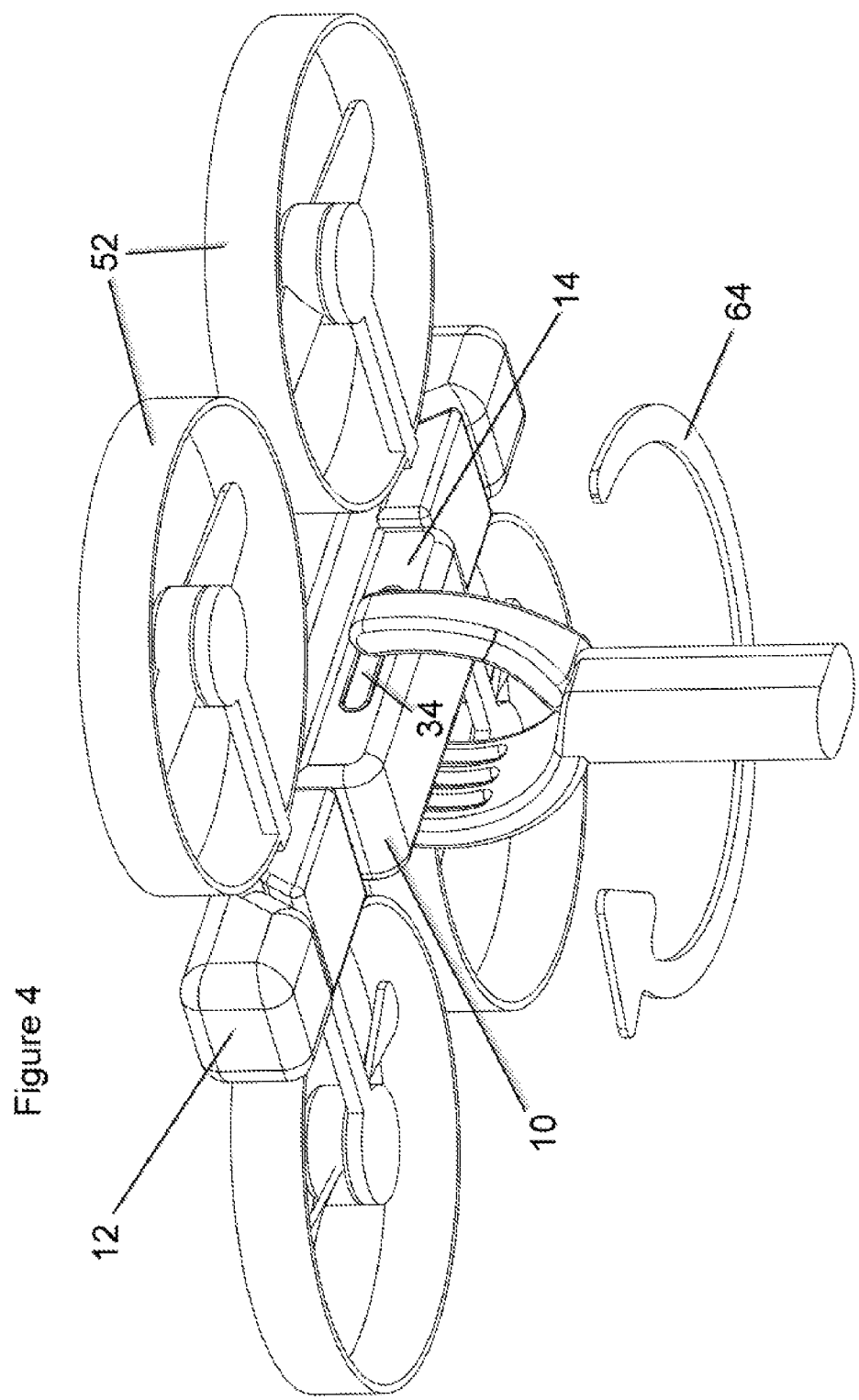

UAV WITH SELECTIVE OPERATIONAL CONTROL DURING HOLDING

BACKGROUND

Technical Field

Embodiments described herein relate generally to unmanned aerial vehicles (UAVs). More particularly, embodiments described herein relate to improvements in the control of a UAV.

Description of the Related Art

Unmanned aerial vehicles (UAV's) have been commercially available and recreationally used for many years, with radio-controlled airplanes and helicopters being the most popular. Unfortunately, these early UAV designs were inherently complicated to assemble and maintain, expensive, and difficult to operate during flight. Today, a common configuration of a UAV is a quadcopter, which is essentially four rotor pods attached to a fuselage. The fuselage contains or supports a battery and the required controlling electronics (usually including a flight control board, a receiver circuit, and an electric speed control (ESC) circuit, which controls the operation of each of the four motors). The quadcopter is controlled using a transmitter (remote control unit), which may be a separate dedicated device, or may be controlled using a smart phone following a prescribed app. Regardless of the format of the transmitter used, Applicants have recognized a problem that often occurs when a single operator attempts a controlled takeoff.

A typical transmitter includes various controls whose movements are converted into instructions and transmitted to control the quadcopter, thereby establishing controlled flight. User input in such a transmitter is created through the use of multiple levers each attached to encoders which provide two degrees of freedom. The range of the encoders in a typical two-stick setup can be mapped to control the attitude of the unmanned vehicle or control angular or inertial rates in any combination. An example of such a control regime is shown in what is called a "Mode 1" transmitter controller configuration, wherein a right gimbal stick is used to control attitude, roll, and pitch, and a left gimbal stick is used to control a combination of inertial rate and attitude, altitude climb/descent rate and yaw. These controllers also typically include switches used to control state of the unmanned vehicle, as well as trim the default value of the control lever encoders when in their default un-actuated position.

During takeoff, it is common for a person to hold the fuselage of a UAV in one hand while simultaneously holding the control unit in the other hand. This practice necessitates that the user manipulate the control inputs of the UAV until the UAV is ready to be launched. When the UAV becomes airborne, it is not uncommon for it to require immediate adjustments to control inputs, which in turn require the use of both hands.

A problem with this method to initiate takeoff is that it is difficult to control the flight controls of the transmitter with one hand while holding the UAV in the other without additional knowledge of the state of the takeoff, such as whether the UAV is currently held or not currently held.

BRIEF DESCRIPTION OF THE DRAWINGS

FIG. 2 is an illustrative block diagram showing operational components of the battery pack.

FIG. 3 is an illustrative block diagram showing operational components of a quadcopter.

FIG. 4 is a perspective view of a representative quadcopter and battery pack together being held by a human hand.

DETAILED DESCRIPTION

Figure 1:
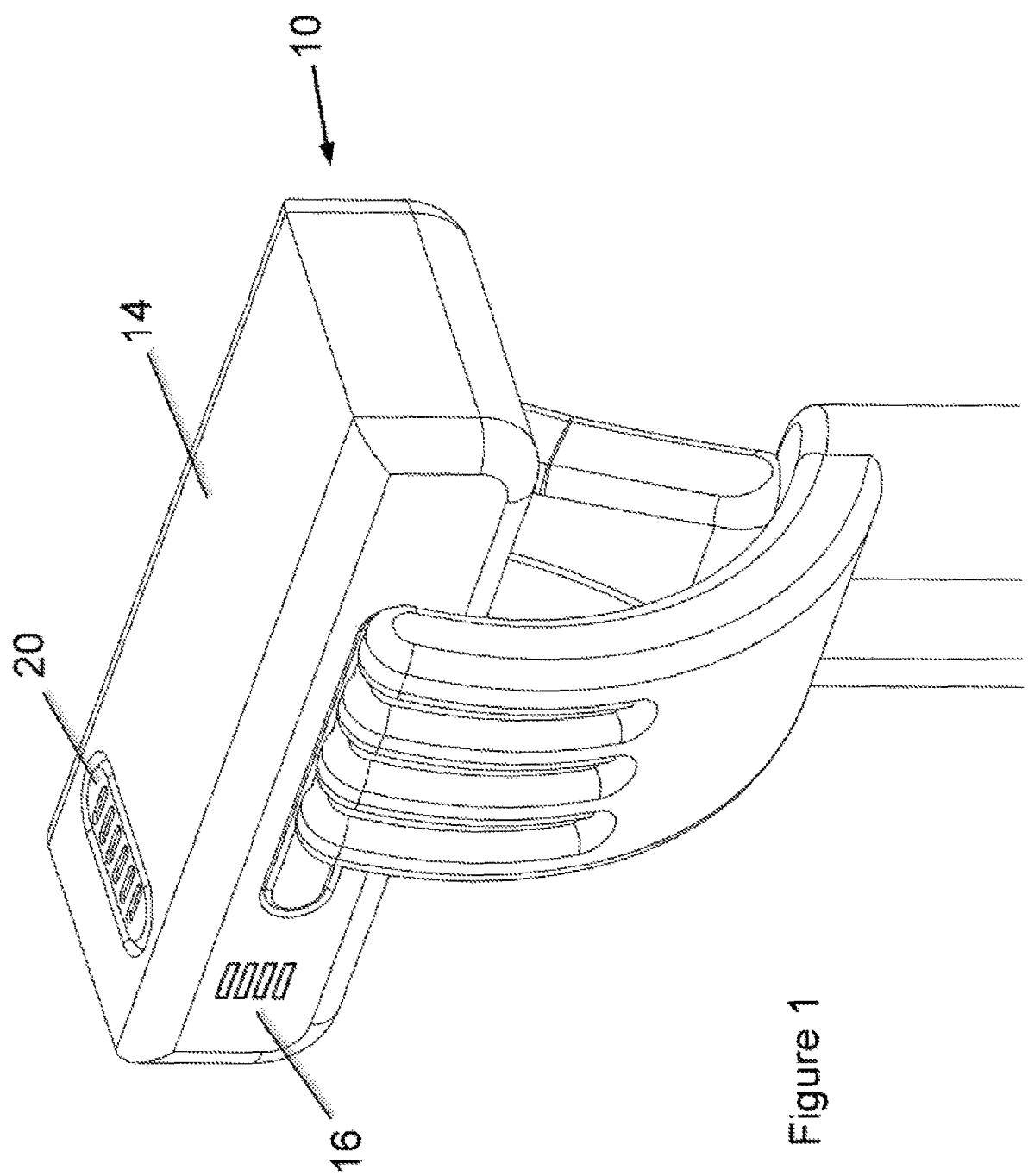
FIG. 1 is a perspective view of a battery pack including at least one touch sensor.

By way of introduction, certain embodiments described herein provide an improved rechargeable battery pack for use with UAVs. As described in greater detail below, the battery pack includes sensors and electronics that detects when a user touches or holds it and further allows for gesture interactional control of specific operational features of the UAV. Although certain embodiments described herein are directed to the field of power supplies for UAVs, it can easily be applied to other fields where a rechargeable battery pack is used to power an electronic device. According to another embodiment, when a user touches the battery pack, specific information relating to the battery is conveyed to the user using LEDs Description of the Hardware Referring now to the figures, a battery pack 10 is shown being held by a hand 12 of a user (not shown). Battery pack 10 includes a housing 14, a visible array of LEDs 16 (to indicate battery information, as detailed below, and other information), and a multiple-contact electrical connector 20. The LEDs 16 may in some embodiments be multicolored, and may be used, for example, to indicate battery information and other information, as described in greater detail below. Electrical connector 20 is used to provide selectively-releasable electrical connection between battery pack 10 and a UAV 12 (as shown in FIG. 4), or an electrical charger (not shown).

Referring now to FIG. 2, battery pack 10 includes several internal electrical components 22, including rechargeable battery cells 30, a microprocessor 32, a capacitive sensing circuit 34, a charging circuit 36, a thermal protection sensor 38, an an LED driver circuit 40.

As shown in FIG. 2, microprocessor 32 is electrically connected to battery cells 30, charging circuit 36, connector 20, thermal protection sensor 38, LED driver 40 and capacitive sensing circuit 34. Microprocessor 32 can be configured to monitor the condition of battery cells 30 as the cells are charged, on standby and during use. Thermal protection sensor 38 can be configured to to monitor the temperature of cells 30, and microprocessor 32 can be configured to use this information to disconnect the output of battery cells 30 to the load (UAV), or interrupt a charging cycle, should the temperature of battery cells 30 exceed a predetermined threshold value.

Microprocessor 32 can also be configured to continuously or periodically monitor the current charge of battery cells 30 and instructs LED driver 40 to illuminate LEDs 16 to convey the current charge and other information. For example, if 4 LEDs are used, all four could be illuminated to indicate fully charged and healthy battery cells. As battery cells deplete during use or otherwise, microprocessor 32 would detect this and could instruct LED driver 40 to illuminate fewer LEDs to indicate the current charge. A single LED illuminated may be instructed to flash at a predetermined interval to indicate that battery cells are on the verge of having a charge that is less than a prescribed threshold charge value.

As mentioned above, other battery pack information may be conveyed to the user using LEDs 16. For example, if microprocessor 32 determines that one of battery cells 30 is defective, or is overheating, then LED driver can be instructed to flash all LEDs red, for example. This will allow the user to visually understand the condition of battery pack 10 and act accordingly.

Charging circuit 36 connects battery cells 30 to connector 20 so that when connector 20 is secured to an appropriate charging unit (not shown), battery cells 30 can receive a charging current. As mentioned above, microprocessor 32 will monitor the condition, temperature and charge level of battery cells 30 during charging and can control the charging process, accordingly.

In certain embodiments, a capacitive sensing circuit 34 may be included in battery pack 10, or in another exposed section of a UAV body or other component which will be handled by a user. A capacitive sensing circuit can use two antennas, which may be of different sizes, connected to a circuit that can compare changes of capacitance between the antennas. The antennas, although not shown in detail, are positioned within battery pack 10 or another UAV component in such a manner that if a user touches housing 14 of battery pack 10, the capacitance of at least one antenna will change. This change can be detected and a signal indicating this change is sent to microprocessor 32. It should be noted that although the use of capacitive sensing is a useful method to detect when a user is holding, touching, or moving battery pack 10, other methods may be used, including but not limited to a contact switch, a strip switch, a momentary switch, a membrane switch, a pressure-based switch, an inertial measurement unit (IMU), and an absolute distance measuring sensor such as an ultrasonic sensor. Additionally, other combinations of data from sensors could be used to determine if UAV 12 is being manipulated by a user. For example, a combination of motor throttle levels, altitude, and GPS location could be used to distinguish a user manipulation of UAV 12.

In another embodiment an additional UI camera is integrated into the UAV and is aimed to view the UAV body and vicinity. A microprocessor is functionally connected to the UI camera and includes UI image processing software (for example OpenCV) that is coded to recognize human features engaged with the UAV. The sample rate of such a system could be relatively low and thus would be operably energy efficient. Whichever sensing structure is used, it can in some embodiments allow microprocessor 32 be able to determine exactly when a user is holding or touching battery pack 10 or another portion of a UAV.

Touch Activated Battery Fuel Gauge

In some embodiments, when a person touches housing 14 of battery pack 10, such as when the user picks up battery pack 10, microprocessor 32 will detect this and will instruct LED driver 40 to light up LEDs 16 according to the current charge of battery cells 30. So, this will allow a user to quickly determine the current charge on battery pack 10, as he or she merely has to touch or pick up housing 14. LEDs 16 may in some embodiments otherwise be deactivated to conserve power. However, select onboard electrical components may be continuously powered by battery cells 32, in "sleep" mode so that the above-described capacitive sensor 34 will operate correctly when the user touches housing 14. The power drain of battery cells 32 is minimal.

In other embodiments, different or additional information may be conveyed, through selective and controlled illumination of LEDs 16, when housing 14 is touched by a user. Any number of LEDs 16 may be used, but 4 or 5 LEDs may be a useful number of LEDs in certain embodiments, although more or fewer LEDs may be used in other embodiments. LEDs 16 are in some embodiments of a type which may illuminate different colors. Various information regarding battery pack 10 may be conveyed to the user using LEDs 16 by activating select LEDs, changing the color of select LEDs, and selectively flashing any of the LEDs. Information may be provided (e.g., printed or embossed) on housing 14 immediately adjacent to each LED to help the user understand what a particular LED illumination pattern means. For example, if a battery cell is determined by microprocessor 32 to be defective, then in some embodiments all four LEDs 16 can be configured to be driven flash red in color at 1 second intervals. Printed information on housing 14 may explain this: "ALL FLASHING RED—DEFECTIVE CELLS—DO NOT USE." If the cells are overheating, in some embodiments each LED can be driven to illuminate sequentially in red color, lighting up one LED at a time. These display modes are merely exemplary, and any number of suitable display modes can be used to convey information about the status of the UAV and the components, such as the batter pack 10.

Additionally, capacitive sensing 34 may be used to change modes or change what information is displayed by LEDs 16. For example, when the user first touches housing 14, LEDs 16 can in some embodiments always display the current charge of the battery cells 30. If the user releases the housing for a second, but then retouches it within a period of time (e.g., 5 seconds), then in some embodiments additional information regarding battery cells 30 may be displayed, such as overheating or a defective condition. The capacitive sensing 34 may thus be responsive to touch patterns, in addition to individual touches, and different touch patterns may trigger different responses.

It may be a useful feature in some embodiments that when a user touches housing 14, LEDs 16 will illuminate for a fixed or short period of time, e.g., under 10 seconds, regardless of how long the user touches the housing. If the user holds housing for a minute, for example, LEDs 16 will only illuminate for 10 seconds (or another short period of time). Thus, the initial touch may be configured to trigger a response for a fixed period of time, while continued touching need not continually trigger that same response.

The duration of the response can also be used to provide feedback for the user. Applicant contemplates varying the length of time that LEDs illuminate in response to the measured charge of battery cells 30. For example, if the charge is full, then all LEDs 16 will illuminate (in green color) for 10 seconds. However, if the charge is low, then perhaps a single LED 16 will illuminate for a shorter period of time (3-5 seconds). Alternatively, LEDs 16 may remain illuminated (conveying the prescribed information) continuously for as long as the user touches housing 14 and thereafter for a prescribed period of time (1-10 seconds). Thus, in some embodiments, a continued touch may trigger a particular response for the duration of the touch, and in some embodiments the cessation of the touch may also trigger a particular response.

In place of using array of LEDs 16, a digital display may be used that provides a number (between 1 and 10, or between 1 and 100), wherein a displayed number would represent the current charge of battery cells 30. For example, a number of 95 would indicate almost fully charged cells, whereas if the number 19 is displayed, the battery cells are pretty low and require charging. If a number display is used, in place of a bar-graph style array of LEDs 16, the number display can still be configured to only when a user touches housing 14, as described above. Otherwise, the number display can be configured to remain off.

In some embodiments, a number display (not shown) is provided in place of LEDs 16, and displays an estimated number of minutes remaining of battery use during flight use, such as 17 minutes. This value can be calculated, for example, by monitoring previous discharge rates of battery cells 30, during UAV 12 flights, when battery pack 10 is connected to and powering UAV 12. If, based on a measured battery charge reading, flight time is less than a predetermined value, such as 5 minutes, the number "5" can flash, providing an indication to a user that flight using that particular battery pack 10 is not recommended and that battery pack 10 should be connected to a charger (not shown) or replaced.

Capacitive sensing 34, as described above may function both if battery pack 10, is not connected to anything and also when it is connected to and powering UAV 12. It is important that the user of UAV 12 be able to quickly understand the condition and charge value of battery 10 before flight and the present capacitive sensing system described above allows for this. In some embodiments, LEDs 16 can be displayed continuously when battery pack 10 is connected to a charger (not shown).

Referring now to FIG. 3, a representational UAV 12 is shown with typical operational components, including a microprocessor 50, motors and flight control circuitry 52 (combined here for clarity), a power control circuitry 54, accelerometers 56, a gyro sensor 58, a magnetometer, and a camera 60. UAC 12 also includes an electrical connector 62 that is sized and shaped to selectively and electrically connect with electrical connector 20 of battery pack 10. As described below, once battery pack 10 is electrically connected to UAV 12, select components of battery pack 10 will be in electrical communication with select electrical components of UAV 12.

As shown in FIG. 3, microprocessor 50 is connected to connector 62, power control circuit 54, motors and flight control circuit 52, accelerometers 56, camera 60 and gyro sensor 58. Power control circuit 54 is connected to connector 62 and motors and flight control circuit 52. When UAV 12 and battery pack 10 are electrically connected to each other (by securing connector 62 to connector 20), microprocessor 50 of UAV 12 will become electrically connected to microprocessor 32 of battery pack 10. Similarly, power control circuitry 54 of UAV 12 will become electrically connected to battery cells 30 of battery pack 10. Battery cells 30 provide power (either directly or indirectly) to all electrical components of battery pack 10 and, when connected thereto, of UAV 12. Power control circuitry 54 of UAV 12 manages the power of the connected battery cells 30, and provides the power to each component of UAV 12, as required.

Referring now to FIGS. 2, 3 and 4, and according to another embodiment, when battery pack 10 is electrically connected to UAV 12, and being held by a user, as shown in FIG. 4, select rotational movement (about a vertical yaw axis) of UAV 12 by the user will be detected by gyro sensor 58 and accelerometers 56, and connected microprocessor 50 of UAV 12. Microprocessor 50 will also detect, from microprocessor 32 and capacitive sensing 34 of battery pack 10, that a person is holding housing 14 (and therefore also UAV 12). As an example, the user rotates UAV 12 counterclockwise (as viewed looking down), which is graphically illustrated by arrow 64, in FIG. 4.

Controlling UAV Modes of Operation with Touch

In some embodiments, the specific rotational movement information, made by the user rotating UAV 12 while holding battery pack 10, will be sent to microprocessor 50 of UAV 12 and, in turn, microprocessor 50 will compare the measured movement signature with known predetermined movement signatures (stored in memory, not shown, but connected to microprocessor 50). If a match is found between known signatures and the actual measured movement signature, a predetermined action can be performed.

One useful action which can be performed, in response to detecting a quick rotational movement of UAV 12 by the user, is activating all four motors 52 full power for UAV 12 launch. With this arrangement, a single flight operator does not have to activate all motors 52 (using a separate controller, not shown) before launching UAV 12, but can now get everything ready for flight, without powering up motors 52 and then when ready, simply hold UAV 12 away from their body and rotate UAV 12 (while holding battery pack 10) quickly counterclockwise and let go. Motors 52 will automatically power up and send UAV 12 airborne. The user may then return his or her attention to their controller to control flight. Once the user releases their hold of housing 14 of battery pack 10, microprocessor 32 and capacitive sensing 34 can detect this and will send this information to microprocessor 50 so that any subsequent movement of UAV 12 (while in flight) will not be misconstrued as a gestural action request by the user.

Furthermore, in certain embodiments, as long as the user holds battery pack 10, and such holding is detected by capacitive sensing 34, as described above, microprocessor 50 can instruct motors and flight control circuitry 52 to maintain a hover position, at whichever position, in 3-D space, the user holds UAV 12. According to this feature or mode of operation), the user is able to place UAV 12 anywhere in 3-D space and have it maintain that specific and desired 3-D location, once the user releases UAV 12.

Additionally, the user may grasp a hovering UAV 12 again, after letting it go, and reposition it to a different location in 3-D space. Each time the user grasps UAV 12 (by grasping battery pack 10 or another portion of the UAV with integrated capacitive sensors), capacitive sensor 34 and microprocessors 34 and 50 detect the user's hand-contact and, following this mode of operation, would allow the user to relocate UAV 12 in 3-D space and will not "fight" the user's repositioning motion (e.g., by powering motors 52 to maintain a hover at the previous location in 3-D space).

Once the user again releases UAV 12 and battery pack 10, the release is again detected, as described above, and, according to this mode of operation, microprocessor 50 will again instruct motors and flight control circuitry 52 to maintain a hover at the new location in 3-D space.

This repositioning feature, as described above, includes both position in 3-D space, and orientation (about the vertical yaw axis, not shown). This allows the user to not only position UAV 12 to hover anywhere in 3-D space, but also allows the user to orient UAV 12 about the yaw axis, as well. This feature is useful for the user to carefully position the view of camera 60 of UAV 12 within a scene prior to flight.

In certain embodiments, a user may grab onto battery pack 10, connected to an operating and hovering UAV 12 and "push" or "throw" UAV 12 along a desired path at a desired speed (and a desired UAV yaw orientation). Again, as described above, capacitive sensing 34 and microprocessor 50 will determine that the user is holding UAV 12 and, according to this mode of operation, microprocessor 50 will use onboard gyros 58 and accelerometers 56 to immediately calculate the speed of the "push" and the direction of the push in 3-D space. Once the user releases UAV 12, microprocessor 50 and capacitive sensing 34 will sense the release and will, according to this mode, instruct motors and flight control circuitry 52 to power UAV 12 to continue flight along the desired path at the desired speed, maintaining the desired yaw orientation. The mode may be set to keep the desired path within a selected horizontal plane, or may be allowed to follow any path in 3-D space, such as moving upward along a 45 degree path. Should the user direct UAV 12 to follow a path that will cause UAV 12 to impact an object, such as a wall or the ground, onboard sensors (not shown) can detect this and will automatically override the flight path to prevent impact.

By using onboard gyros 58 and accelerometers 56, when UAV 12 is being held (as determined by capacitive sensor 34 of battery pack 10), select movement of UAV 12 can be used to control specific operations of UAV 12. Various other gesture actions of UAV may be used to generate a specific known response. If the user quickly rotates UAV 12 in a clockwise direction (about a vertical yaw axis), for example, microprocessor 50 will detect this motion (and will detect, through microprocessor 32 and capacitive sensing 34 of battery pack 10) that UAV 12 is being held by a user and is not in flight, and can respond by putting UAV 12 into a controlled hover.

Likewise if the user quickly rotates UAV 12 in a counterclockwise direction (about the yaw axis), microprocessor 50 will detect this motion (and will detect, through microprocessor 32 and capacitive sensing 34 of battery pack 10) that UAV 12 is being held by a user and is not in flight, and can respond by powering down motors and flight control circuitry 52.

Microprocessor 50, gyro sensor 58 and accelerometers 56 of UAV 12 may be used to detect other deliberate gestural movements to generate other actions. These include rotational movement about any of the yaw, roll and pitch axes, movement in either direction, and linear movements. Also, the rate of acceleration of UAV 12 can be accurately detected and further used to identify or trigger a specific, predetermined action.

Controlling Automated Flight with Touch and UAV Gestures

In other embodiments microprocessor 50, gyro sensor 58, accelerometers 56, and capacitive sensing of UAV 12 may be used to detect other deliberate gestural movements to setup and initiate UAV 12 automated modes of operation that do not require the use of a remote control unit. In one such embodiment UAV 12 includes an out-and-back software program for controlling an automated flight path with a corresponding automated camera function, referred to as an out-and-back maneuver. The out-and-back consists of UAV 12 flying a specified distance (for example 200 feet), at a specified velocity in a linear, upward angled flight path away from a starting point. UAV 12 then automatically flies back toward the starting point along the same flight path with a specified velocity. During the flight out and flight back, UAV 12 camera 60 direction is fixed on the starting point and is recording video.

The out-and-back flight path, or any other flight paths, behaviors, or routines, may be defined, authored, or executed in conjunction with a separate application running on a computing device such as a smartphone, laptop, or tablet. Predefined flight paths, which may be location independent or tied to a particular geographic location, may be distributed via a centralized server or other service, and may be downloaded using a computing device. Further details regarding the generation and execution of such flight paths are provided in U.S. Patent Application Publication No. 2016/0306351, entitled SYSTEM FOR AUTHORING, EXECUTING, AND DISTRIBUTING UNMANNED AERIAL VEHICLE FLIGHT-BEHAVIOR PROFILES and published on Oct. 20, 2016, the disclosure of which is hereby incorporated by reference in its entirety. The motion and/or touch sensors may be used to trigger or modify these flight paths, behaviors, or routines.

The out-and-back automated flight is initiated by the user holding UAV 12 overhead by battery pack 10 (thereby triggering capacitive sensing circuit 34), and moving UAV 12 in a substantially linear upwardly angled path to describe a desired direction of a desired out-and-back flight path. The out-and-back program in combination with microprocessor 50 receives motion data from accelerometers 56 and derives a direction for, and initiates, the automated out-and-back flight. The actions and functions described allow UAV 12 user to simply launch UAV 12 into the air to initiate the out-and-back flight, without the use of a controller.

Alternative Locations for the Capacitive Sensor and Other Components

Although one useful arrangement, as described above, is to include capacitive sensing 34 and microprocessor 32 within battery pack 10, the above described capacitive sensing function, and supporting electronic components, can, in other embodiments, be additionally provided in fuselage of UAV 12, along with or in place of the capacitive sensing function of battery pack 10. Should capacitive sensing be located only within UAV fuselage and not in battery pack 10, battery pack 10 need not include microprocessor 32 and capacitive sensor 34. Furthermore, LED driver 40 and LEDs 16 may also be located on fuselage of UAV 12, instead of in battery pack 10 so that after battery pack 10 is connected to fuselage of UAV 12, LEDs 16 on the fuselage of UAV 12 can display the charge of connected battery pack 10.

The capacitive sensing features described herein can function in a similar manner, regardless of where is the capacitive sensors are located (battery pack 10, or UAV 12, or both). Once battery pack 10 is electrically and mechanically connected to UAV 12, a user may generate a gesture movement, such as rotating UAV 12 counterclockwise, quickly about the vertical yaw axis about 90 arc degrees. As before (when the capacitive sensing feature was only located within battery pack 10), capacitive sensor 34 (now located within UAV 12), will detect this movement and, as before, send the movement signature signal to microprocessor 50 (located on UAV 12) to be processed in a similar manner, as before, described above.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An unmanned aerial vehicle (UAV) comprising:
   at least one motor,
   a microprocessor,
   a removable battery section; and
   a touch sensor located in a housing of the removable battery section, where the microprocessor changes the state of the at least one motor in response to activation of the touch sensor.

2. The UAV of claim 1, additionally comprising at least one display indicator, the at least one display indicator configured to display a representation of the state of the removable battery section in response to an activation of the touch sensor.

3. The UAV of claim 1, additionally comprising a motion sensor, wherein the microprocessor changes the state of the at least one motor in response to an activation of the touch sensor and the motion sensor.

4. The UAV of claim 3, wherein the microprocessor is configured to trigger the UAV to execute a predetermined flight behavior in response to an activation of the touch sensor and the motion sensor.

5. The UAV of claim 3, wherein the microprocessor is configured to change a state of the UAV in response to activation of the touch sensor and the motion sensor.

6. An unmanned aerial vehicle (UAV) comprising:
   at least one motor,
   a microprocessor,
   at least one motion sensor
   a removable battery section; and
   a touch sensor located in a housing of the removable battery section, where the microprocessor changes the state of the UAV in response to input from the touch sensor and input from the motion sensor.

7. The UAV of claim 6, wherein the UAV is configured to power down the state of the UAV in response to input from the touch sensor and the at least one motion sensor.

8. The UAV of claim 7, wherein the at least one motion sensor comprises an inertial measurement unit.

9. The UAV of claim 7, wherein the UAV is configured to power down the state of the UAV in response to a rotational movement of the UAV detected by the at least one motion sensor.

10. An unmanned aerial vehicle (UAV) comprising:
    a UAV housing;
    at least one motor;
    a removable battery pack;
    a sensor array disposed within the UAV housing, the sensor array including at least one touch sensor on a housing of the removable battery pack and at least one motion sensor disposed within the UAV housing, and
    a processor disposed within the UAV housing and configured to alter the state of the UAV in one of a plurality of predetermined responses, each of the plurality of predetermined responses corresponding to an input received from the sensor array indicative of patterns of at least one of touch and movement of the UAV.

11. The UAV of claim 10, wherein the processor is configured to execute a predetermined flight behavior in response to a specific pattern of movement of the UAV during a period in which the touch sensor detects contact with a user.

12. The UAV of claim 11, wherein the flight behavior is dependent at least in part on the direction of movement of the UAV during the period in which the touch sensor detects contact with the user.

13. The UAV of claim 10, wherein the at least one touch sensor comprises a capacitive touch sensor.

14. The UAV of claim 10, wherein the at least one motion sensor comprises an inertial measurement unit.

15. The UAV of claim 10, wherein the sensor array comprises an accelerometer, a gyro sensor, and a magnetometer.

* * * * *